(12) United States Patent
Dilts et al.

(10) Patent No.: US 9,137,944 B2
(45) Date of Patent: Sep. 22, 2015

(54) WINDROW DOOR FOR AN AGRICULTURAL COMBINE

(75) Inventors: Mark David Dilts, New Holland, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 187 days.

(21) Appl. No.: 13/600,733

(22) Filed: Aug. 31, 2012

(65) Prior Publication Data

US 2014/0066147 A1    Mar. 6, 2014

(51) Int. Cl.
*A01F 12/30* (2006.01)
*A01D 41/12* (2006.01)

(52) U.S. Cl.
CPC .................................. *A01D 41/1243* (2013.01)

(58) Field of Classification Search
CPC .................................................. A01D 41/1243
USPC .................................................. 460/111, 112
See application file for complete search history.

(56) References Cited

U.S. PATENT DOCUMENTS

| | | | | |
|---|---|---|---|---|
| 4,056,107 | A * | 11/1977 | Todd et al. ...................... | 460/112 |
| 4,263,772 | A | 4/1981 | Phillips et al. | |
| 4,489,734 | A | 12/1984 | Van Overschelde | |
| 4,646,757 | A * | 3/1987 | Schmitt et al. ................. | 460/112 |
| 4,669,489 | A * | 6/1987 | Schraeder et al. ............. | 460/112 |
| 5,556,042 | A | 9/1996 | Roberg | |
| 6,598,812 | B1 | 7/2003 | Matousek et al. | |
| 6,656,038 | B1 * | 12/2003 | Persson ......................... | 460/112 |
| 6,685,558 | B2 | 2/2004 | Niermann et al. | |
| 6,719,627 | B2 * | 4/2004 | Wolters et al. ................ | 460/111 |
| 6,783,454 | B2 | 8/2004 | Bueermann | |
| 6,863,605 | B2 * | 3/2005 | Gryspeerdt et al. .......... | 460/111 |
| 7,186,179 | B1 | 3/2007 | Anderson et al. | |
| 7,220,179 | B2 | 5/2007 | Redekop et al. | |
| 7,473,169 | B2 | 1/2009 | Isaac | |
| 7,487,024 | B2 | 2/2009 | Farley et al. | |
| 7,559,833 | B2 | 7/2009 | Isaac et al. | |
| 7,559,883 | B2 * | 7/2009 | Rata et al. ....................... | 492/47 |
| 7,635,299 | B2 | 12/2009 | Murray et al. | |
| 7,648,413 | B2 | 1/2010 | Duquesne et al. | |
| 7,717,779 | B1 * | 5/2010 | Weichholdt et al. .......... | 460/112 |
| 7,927,200 | B2 | 4/2011 | Van Overschelde et al. | |
| 8,010,262 | B2 | 8/2011 | Schroeder et al. | |
| 8,070,570 | B2 | 12/2011 | Murray et al. | |
| 2004/0029624 | A1 * | 2/2004 | Weichholdt ................... | 460/112 |
| 2005/0101363 | A1 * | 5/2005 | Farley et al. .................. | 460/112 |

(Continued)

FOREIGN PATENT DOCUMENTS

| | | |
|---|---|---|
| DE | 2444550 A1 | 4/1976 |
| EP | 0727135 A1 | 8/1996 |
| EP | 1504651 A1 | 2/2005 |

*Primary Examiner* — Thomas B Will
*Assistant Examiner* — Mai Nguyen
(74) *Attorney, Agent, or Firm* — Patrick M. Sheldrake; Seyed V. Sharifi T.

(57) ABSTRACT

A windrow door for controlling a direction of flow of crop residue expelled from a combine is disclosed. The windrow door may generally include a door panel extending lengthwise between a first end and a second end. The door panel may be configured to be move relative to a spreader of the combine between a closed position, wherein the crop residue being expelled from the combine is directed along the door panel and into the spreader, and a chute position, wherein the crop residue is directed through a rear opening of the combine and onto the door panel.

18 Claims, 6 Drawing Sheets

(56) References Cited

U.S. PATENT DOCUMENTS

| | | |
|---|---|---|
| 2005/0282602 A1 | 12/2005 | Redekop et al. |
| 2006/0073860 A1* | 4/2006 | Redekop et al. ............. 460/112 |
| 2009/0005137 A1* | 1/2009 | Isaac et al. .................... 460/111 |
| 2009/0042625 A1 | 2/2009 | Dow et al. |

* cited by examiner

WINDROW DOOR FOR AN AGRICULTURAL COMBINE

FIELD OF THE INVENTION

The present subject matter relates generally to agricultural combines and, more particularly, to a windrow door configured to double as a windrow chute for expelling crop residue onto a field as a windrow.

BACKGROUND OF THE INVENTION

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a cage or concave, with the rotor and surrounding concave being oriented so as to extend forwardly to rearwardly within the combine.

During operation of the combine, crop material is fed or directed into a circumferential passage between the rotor and the concave and is carried rearwardly along a generally helical path through such passage by rotation of the rotor as grain is threshed from the crop material. The flow of crop residue remaining between the rotor and concave after threshing is typically discharged or expelled at a rear or downstream end of the rotor. After discharge from the threshing system, the crop residue is typically directed into a crop residue distribution system located below and rearwardly of the rear end of the rotor. The crop residue distribution system typically includes a rotary beater or chopper or other apparatus that beats or chops the residue into smaller pieces and propels the finer crop residue rearwardly towards an area within the rear end of the combine, hereinafter referred to as a distribution chamber. The crop residue provided within the distribution chamber may either be discharged therefrom onto a field as a windrow or directed into a chopper and/or spreader mounted on or at the rear end of the combine that is operable for spreading the residue over a swath of the field.

Windrowing typically occurs when, under certain conditions and in certain localities, users desire to retain the crop residue for post-processing. In such cases, the residue, which may be chopped or un-chopped, is discharged from the combine, without entering the chopper/spreader, to form a windrow directly behind the combine. Such windrow may, for example, contain only straw residue or both straw residue and chaff, and may typically be produced by the expulsion of the residue flow over the top of the chopper/spreader, such as when the crop residue is discharged through a rear opening of the distribution chamber. As is generally understood, a windrow door is typically positioned at the rear opening and is pivotable about its top end between a closed position, wherein the crop residue is diverted into the chopper/spreader, and an open position, wherein the crop residue is directed over the chopper/spreader and through the rear opening.

When crop residue is to be discharged onto a field as a windrow, it is typically preferred that the crop residue be distributed onto a windrow chute to allow the residue to be formed into a desired windrow shape. Currently, conventional windrow chutes are configured as separate, independent components of combines. For example, a windrow chute is typically mounted via a bracket or linkage at the rear end of a combine so as to be positioned below the point at which the crop residue is expelled from the windrow door. However, by configuring windrow chutes as separate components, the inclusion of a windrow chute onto a combine often results in a significant increase in the overall weight and cost of the combine.

Accordingly, a windrow door that is configured to double as a windrow chute would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a windrow door for controlling a direction of flow of crop residue expelled from a combine. The windrow door may generally include a door panel extending lengthwise between a first end and a second end. The door panel may be configured to be moved relative to a spreader of the combine between a closed position, wherein the crop residue being expelled from the combine is directed along the door panel and into the spreader, and a chute position, wherein the crop residue is directed through a rear opening of the combine and onto the door panel.

In another aspect, the present subject matter is directed to a windrow door for controlling a direction of flow of crop residue expelled from a combine. The window door may generally include an upper door panel extending lengthwise between an upstream end and a downstream end. The upper door panel may be moveable between a closed position, wherein the crop residue being expelled from the combine is directed along the upper door panel towards the spreader, and an opened position, wherein the crop residue is directed along the upper door panel through a rear opening of the combine. The windrow door may also include a lower door panel extending lengthwise between a first end and a second end. The lower door panel may be configured to be moved relative to a spreader of the combine between a closed position and a chute position. The lower door panel may be configured to be moved to the chute position when the upper door panel is in the opened position such that the crop residue expelled through the rear opening is directed onto the lower door panel.

In a further aspect, the present subject matter is directed to an agricultural combine. The combine may include a threshing system configured to separate a flow of crop material into crops and a crop residue and a crop residue distribution system configured to expel the crop residue from the combine. The crop residue distribution system may include a spreader and a windrow door configured to control a direction of flow of the crop residue between the spreader and a rear opening of the combine. The windrow door may include a door panel extending lengthwise between a first end and a second end. The door panel may be configured to be moved relative to the spreader between a closed position, wherein the crop residue being expelled from the combine is directed along the door panel and into the spreader, and a chute position, wherein the crop residue is directed through the rear opening and onto the door panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a windrow door for controlling the direction of flow of crop residue being expelled from an agricultural combine. Specifically, in several embodiments, the windrow door may include a door panel that is moveable relative to a spreader of the combine between a closed position, at which the crop residue is directed along the door panel and into the spreader, and an opened or chute position, at which the crop residue is directed through a rear opening of the combine and onto the door panel. In such embodiments, the door panel may be configured to be angled rearwardly and downwardly from the spreader when in the chute position, thereby permitting the door panel to serve as a windrow chute for the combine. As such, when the crop residue is to be discharged onto a field as a windrow, the residue may be directed through the rear opening and onto the opened door panel. The crop residue may then be decelerated as it flows along the door panel before being dropped from the panel onto the field to form a desired windrow shape.

Figure 1:
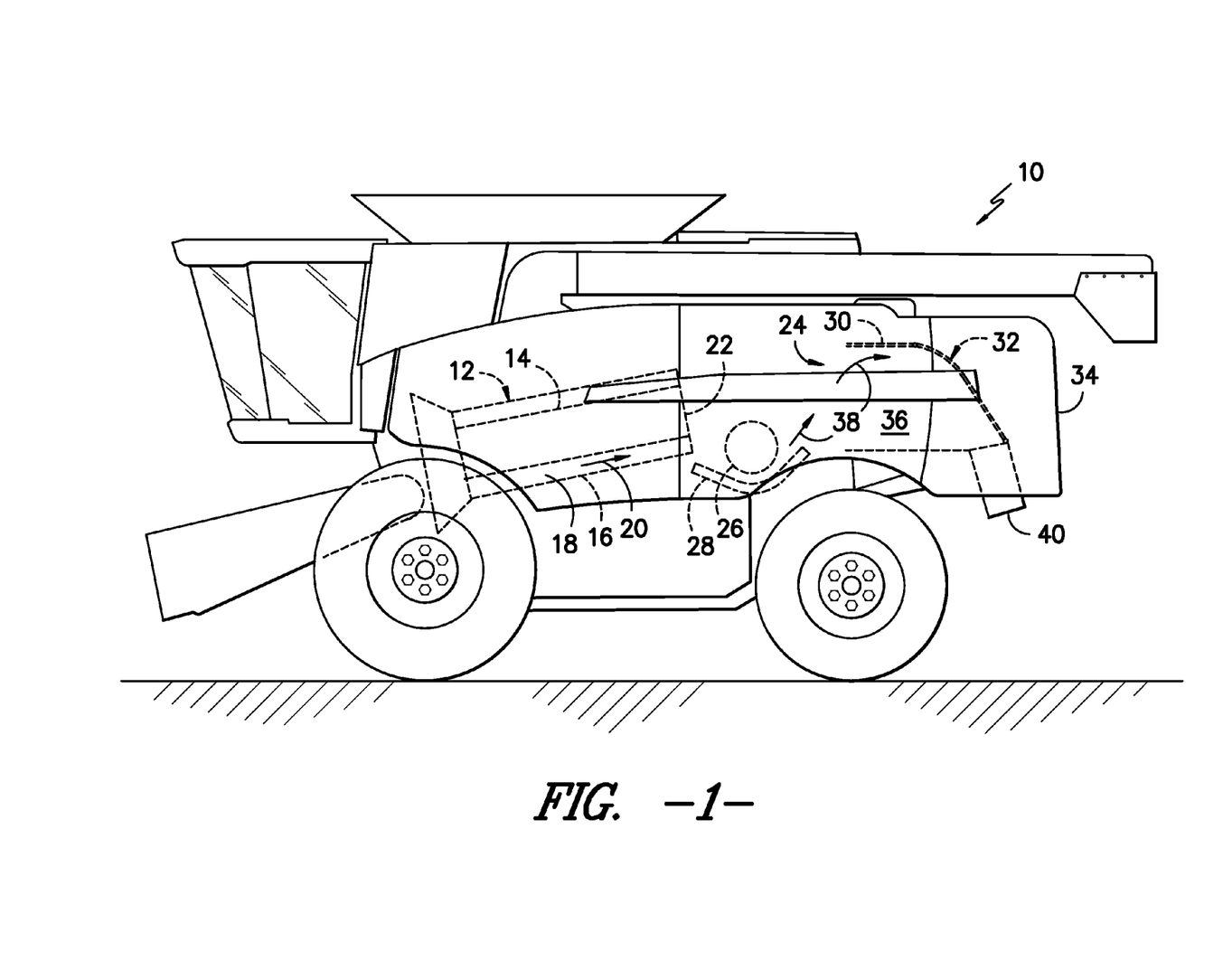
FIG. 1 illustrates a simplified, side view of one embodiment of an agricultural combine.

Referring now to the drawings, FIG. 1 illustrates a simplified, side view of one embodiment of an agricultural combine 10. In general, the combine 10 may be configured the same as or similar to any suitable agricultural combine known in the art. For instance, as shown in FIG. 1, the combine 10 may include an axially arranged threshing system 12. As is generally understood, the threshing system 12 may include a cylindrical rotor 14 rotatably supported within a cage or concave 16 for conveying a flow of crop material in a helical flow path along a circumferential space 18 defined between the rotor 14 and the concave 16. As the crop material is moved through the space 18 towards a rear end 34 of the combine 10 (indicated by arrow 20), the crop (e.g., grain, legumes, and/or the like) may be separated from the residue (e.g., husks, pods and/or the like) and subsequently removed from the threshing system 12. The crop residue may continue along the helical path and may be subsequently discharged through a discharge opening (not shown) defined at a downstream end 22 of the threshing system 12.

In addition, the combine 10 may include a crop residue distribution system 24 for expelling the crop residue from the combine 10. As shown, the distribution system 24 may include a rotary device 26, such as a beater or a chopper, rotatably supported above a concave pan 28. As is generally understood, the rotary device 26 may be configured to be rotated at a rapid speed such that the flow of crop residue exiting the threshing system 12 is propelled rearward along a series of internal shields or panels, such as a guide panel 30 (e.g., a strawhood frame or panel) and a windrow door 32, towards the rear end 34 of the combine 10. For instance, as shown in FIG. 1, the concave pan 28 may be angled in a manner such that the crop residue is propelled rearwardly and upwardly from the rotary device 26 into a distribution chamber 36 wherein the residue is directed along the guide panel 30 towards the windrow door 32 (indicated by arrow 38). As will be described in greater detail below, depending on the whether the windrow door 32 is in a closed or opened position, the crop residue may be directed through the distribution chamber 36 and into either a crop residue chopper and/or spreader 40 for swath spreading or through a rear opening 42 (FIG. 3) of the combine 10 for windrowing. The term "spreader" will be used hereinafter (including in the claims) to refer to any device that is capable of spreading crop residue, including known crop residue choppers and/or spreaders.

It should also be appreciated that the spreader 40 of the combine 10 may generally be configured the same as or similar to any suitable spreader and/or chopper known in the art. For instance, in one embodiment, the spreader 40 may be configured as a vertical spreader and may include two vertically oriented spreader disks configured to distribute the crop residue sideways and rearwardly along a field.

Figure 2:
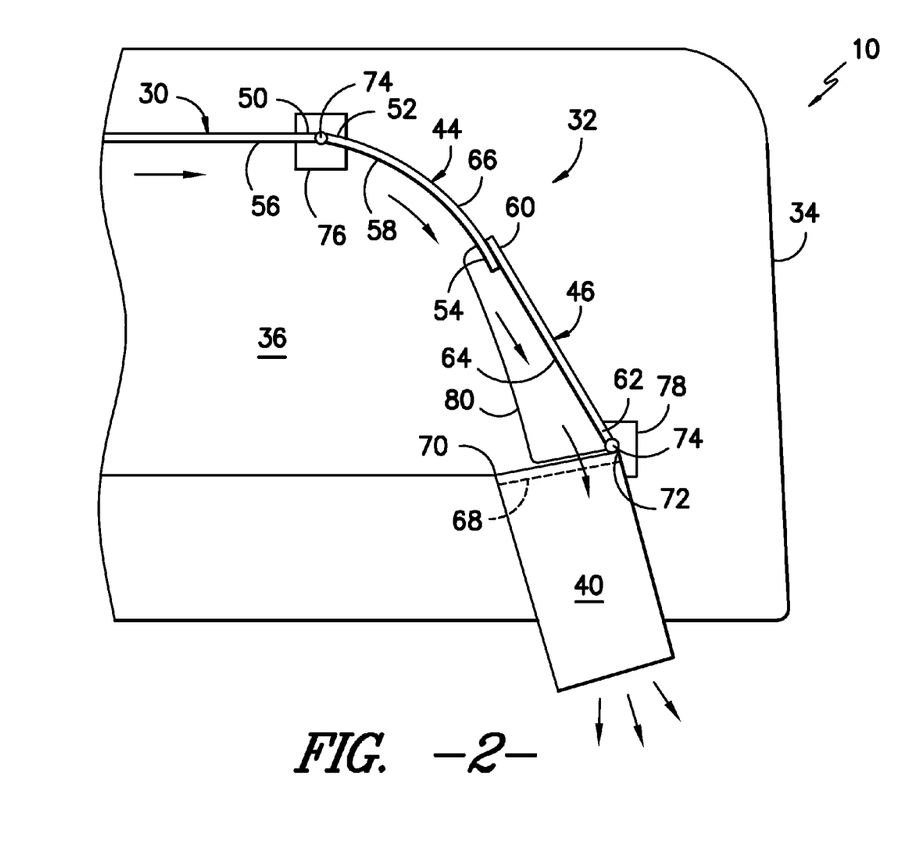
FIG. 2 illustrates an interior, side view of one embodiment of a windrow door configured for use with the combine shown in FIG. 1, particularly illustrating upper and lower door panels of the windrow door in closed positions.
Figure 3:
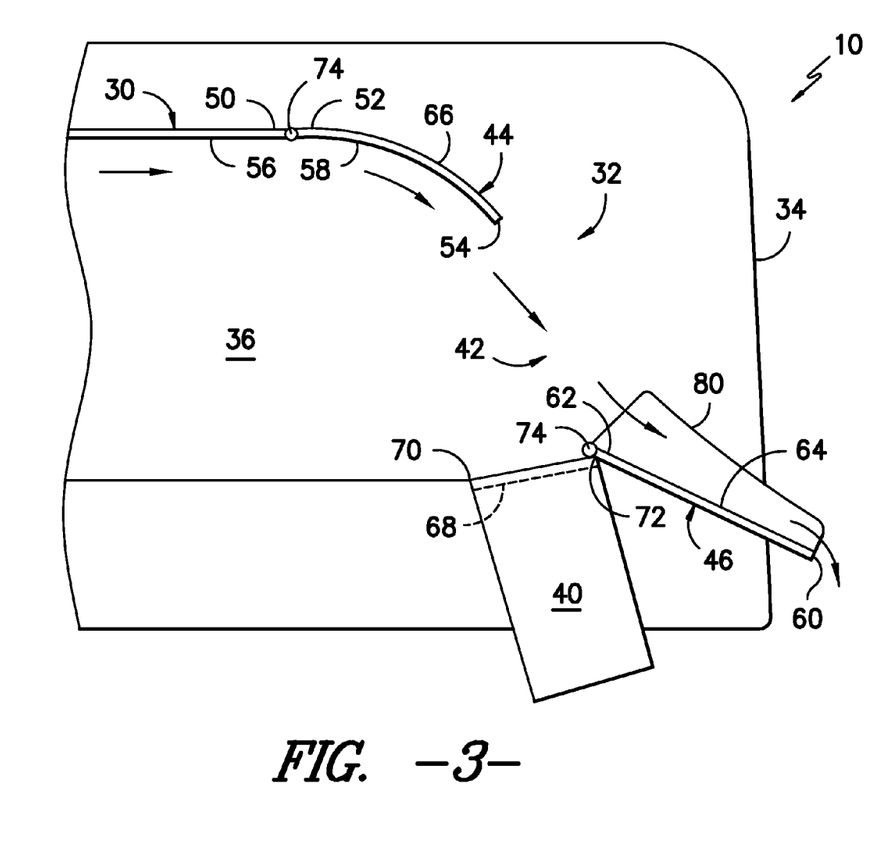
FIG. 3 illustrates another interior, side view of the windrow door shown in FIG. 2, particularly illustrating the upper door panel in an opened position and the lower door panel in a chute position.

Referring now to FIGS. 2 and 3, interior, side views of a portion of the rear end 34 of the combine 10 shown in FIG. 1 are illustrated in accordance with aspects of the present subject matter, particularly illustrating one embodiment of a suitable windrow door 32 that may be utilized with the combine 10. As shown, the windrow door 32 may generally include an upper door panel 44 and a lower door panel 46. In general, the upper door panel 44 may comprise any suitable elongated member that is configured to serve as a guide for the crop residue as it flows past a downstream end 50 of the guide panel 30. For instance, as shown in the illustrated embodiment, the upper door panel 44 may generally extend lengthwise between a top or upstream end 52 and a bottom or downstream end 54, with the upstream end 52 being coupled to the downstream end 50 of the guide panel 30. As such, an inner surface 56 of the guide panel 30 and an inner surface 58 the upper door panel 44 may generally define a substantially continuous flow path for the crop residue flowing within the distribution chamber 36 towards the rear end 34 of the combine 10.

In several embodiments, the upstream end 52 of the upper door panel 44 may be rotatably coupled to the downstream end 50 of the guide panel 30. As such, the upper door panel 44 may be rotated relative to the guide panel 30 in order to alter the direction of flow of the crop residue within the distribution chamber 36. For instance, as shown in FIG. 2, the upper door panel 44 may be configured to be rotated to a closed position at which the curvature or tangential flow direction of the inner surface 58 of the door panel 44 at its downstream end 54 is directed towards the spreader 40. Thus, as the crop residue flows past the guide panel 30, it may be directed along the inner surface 58 of the door panel 44 in the direction of the spreader 40. Alternatively, as shown in FIG. 3, the upper door panel 44 may be configured to be moved to an opened position at which the downstream end 54 of the door panel 44 is rotated away from the spreader 40. As such, when the upper door panel 44 is in the opened position, the crop residue flowing past the guide panel 30 may be directed along the inner surface 58 of the upper door panel 44 and through a rear opening 42 defined at the rear end 34 of the combine 10.

It should be appreciated that the upper door panel 44 may generally define any suitable shape and/or profile that permits the panel 44 to function as described herein. For instance, as shown in FIGS. 2 and 3, the upper door panel 44 may define a curved profile between its upstream and downstream ends 52, 54 in order to allow for a smooth transition of the flow of crop residue between a generally horizontal direction to an angled, downward direction. Additionally, in one embodiment, the upper door panel 44 may also include side panels (not shown) configured to control the width of the flow of crop residue along the inner surface 58 of the upper door panel 44. For instance, in one embodiment, the side panels may be configured to converge between the upstream and downstream ends 52, 54 of the upper door panel 44 such that the width of the flow of crop residue is narrowed as it is directed along the inner surface 58 of the upper door panel 44.

Referring still to FIGS. 2 and 3, the lower door panel 46 of the windrow door 32 may generally be configured to both guide the flow of crop residue into the spreader 40 for swath spreading and serve as a windrow chute for windrowing the crop residue onto a field. Thus, in several embodiments, the lower door panel 46 may generally comprise an elongated member extending lengthwise between a first end 60 and a second end 62, with the second end 62 being rotatably coupled to the spreader 40 to allow the lower door panel 46 to be moved between appropriate positions for guiding the crop residue into the spreader 40 and for windrowing the crop residue onto a field. For example, as shown in FIG. 2, when the upper door panel 44 is in the closed position, the lower door panel 46 may be configured to be rotated into a closed or guide position at which the upper and lower door panels 44, 46 generally define a substantially continuous flow surface for the crop residue flowing into the spreader 40. Specifically, as shown in the illustrated embodiment, the first end 60 of the lower door panel 46 may be configured to overlap the downstream end 54 of the upper door panel 44 when the door panels 44, 46 are in the closed position. As such, the crop residue flowing past the downstream end 54 of the upper door panel 44 may be directed along an inner surface 64 of the lower door panel 46 and into the spreader 40.

It should be appreciated by those of ordinary skill in the art that, in embodiments in which the spreader 40 is configured to be rotated upwards into a stored position, the overlapped configuration of the panels 44, 46 may allow for the lower door panel 46 to slide along an outer surface 66 of the upper door panel 44 as the spreader 44 is rotated. However, in other embodiments, the ends 54, 60 of the upper and lower door panels 44, 46 may be configured to have any other suitable positioning relative to one another when the panels 44, 46 are moved to the closed position. For instance, as an alternative to the overlapped configuration, the downstream end 54 of the upper door panel 44 may be configured to be aligned with the first end 60 of the lower door panel 46 (i.e., by positioning the panels 44, 46 end-to-end) such that a substantially flush surface is defined between the inner surfaces 58, 64 of the upper and lower door panels 44, 46.

It should also be appreciated that, in several embodiments, the lower door panel 46 may be configured to be coupled adjacent to an inlet 68 of the spreader 40 to ensure that the crop residue flowing along the inner surface 64 of the lower door panel 46 is actually directed into the spreader 40. For example, as shown in FIGS. 2 and 3, the inlet 68 of the spreader may include a forward edge 70 and a rear edge 72 disposed opposite the forward edge 70 in the direction of the rear end 34 of the combine 10. In such an embodiment, the second end 62 of the lower door panel 44 may be rotatably coupled to the spreader 40 at the rear edge 72 of the inlet 68 in order to align the inner surface 64 of the lower door panel 46 with the inlet 68.

Additionally, as shown in FIG. 3, when the upper door panel 44 is in the opened position, the lower door panel 46 may be configured to be moved into a chute position, thereby allowing the lower door panel 46 to serve as a windrow chute for the crop residue discharged through the rear opening 42 at the downstream end 54 of the upper door panel 44. Specifically, in several embodiments, the lower door panel 46 may be configured to be rotated outwardly from the closed position towards the rear end 34 of the combine 10 such that the door panel 46 is angled downwardly from its second end 62. For example, as shown in FIG. 3, when moved to the chute position, the lower door panel 46 may be angled such that the first end 60 of the doo panel 46 is located below the rear edge 72 of the spreader inlet 68. Accordingly, the crop residue flowing past the downstream end 54 of the upper door panel 44 may be directed through the rear opening 42 and onto the lower door panel 46. The crop residue may then be directed along the inner surface 64 of the lower door panel 46 and subsequently expelled from the panel 46 at its first end 60 as a windrow onto a field.

It should be appreciated that the rotatable connection between the upper door panel 44 and the guide panel 30, as well as the rotatable connection between the lower door panel 46 and the spreader 40, may generally be achieved using any suitable rotational or hinged attachment means known in the art. For instance, as shown in the illustrated embodiment, a hinge pin or pivot tube 74 may be coupled between the upper door panel 44 and the guide panel 30 and between the lower door panel 46 and the spreader 40. However, in other embodiments, the upper and lower panels 44, 46 may be hingedly coupled to the guide panel 30 and the spreader 40, respectively, using any other suitable hinged and/or rotatable attachment mechanism known in the art.

It should also be appreciated that, in several embodiments, the positions of the upper and lower door panels 44, 46 may be configured to be manually adjusted. For instance, in one embodiment, the position of the panels 44, 46 may be adjusted by means of a spring-loaded pin and/or any other suitable manually adjustable positioning mechanism. In such an embodiment, an operator of the combine 10 may manually adjust the location of the spring-loaded pins and/or other positioning mechanisms in order to move the upper and lower door panels 44, 46 between their respective positions.

Alternatively, the positions of the upper and lower door panels, 46 may be configured to be automatically adjusted. Specifically, in several embodiments, a suitable electronically controllable actuating device may be operatively coupled to each door panel 44, 46. For instance, as shown in FIG. 2, a first electric motor 76 may be coupled to the upper door panel 44 at the hinge axis defined between the upstream end 52 of the upper door panel 44 and the downstream end 50 of the guide panel 30. Similarly, a second electric motor 78 may be coupled to the lower door panel 46 at the hinge axis defined between the second end 62 of the lower door panel 46 and the spreader 40. In such an embodiment, the electric motors 76, 78 may be coupled to a suitable controller to allow the operator to automatically adjust the positions of the upper and lower door panels 44, 46 from within the operator's cab. In further embodiments, any other suitable actuating device, such as a hydraulic or pneumatic cylinder or a mechanical arrangement (e.g., a four bar linkage), may be used to automatically adjust the positions of the upper and lower door panels 44, 46.

Moreover, as shown in FIGS. 2 and 3, in several embodiments, the lower door panel 46 may include a pair of side panels 80 (one of which is shown) extending outwardly from its inner surface 64. Specifically, as shown in the illustrated embodiment, the side panels 80 may be configured to extend along the inner surface 80 between the first and second ends 60, 62 of the lower door panel 46. As such, the side panels 80 may be configured to control the width of the crop residue as it flows along the inner surface 64 of the door panel 46. For example, in one embodiment, the side panels 80 may converge (or diverge) between the ends 60, 62 of the lower door panel 46 such that the width of the crop residue is narrowed (or broadened) as it flows from the second end 62 of the lower door panel 46 to the first end 60 of the lower door panel 46. Additionally, in one embodiment, the side panels 80 may be configured to pivot relative to one another and/or the inner surface 64 to permit the amount of convergence (or divergence) to be adjusted. For example, the side panels 80 may be configured to be pivoted to a first position for fitting the lower door panel 46 over the upper door panel 44 when the lower door panel 46 is moved to the closed position and to a second position for forming a desirable windrow when the lower door panel 46 is moved to the chute position.

Figure 4:
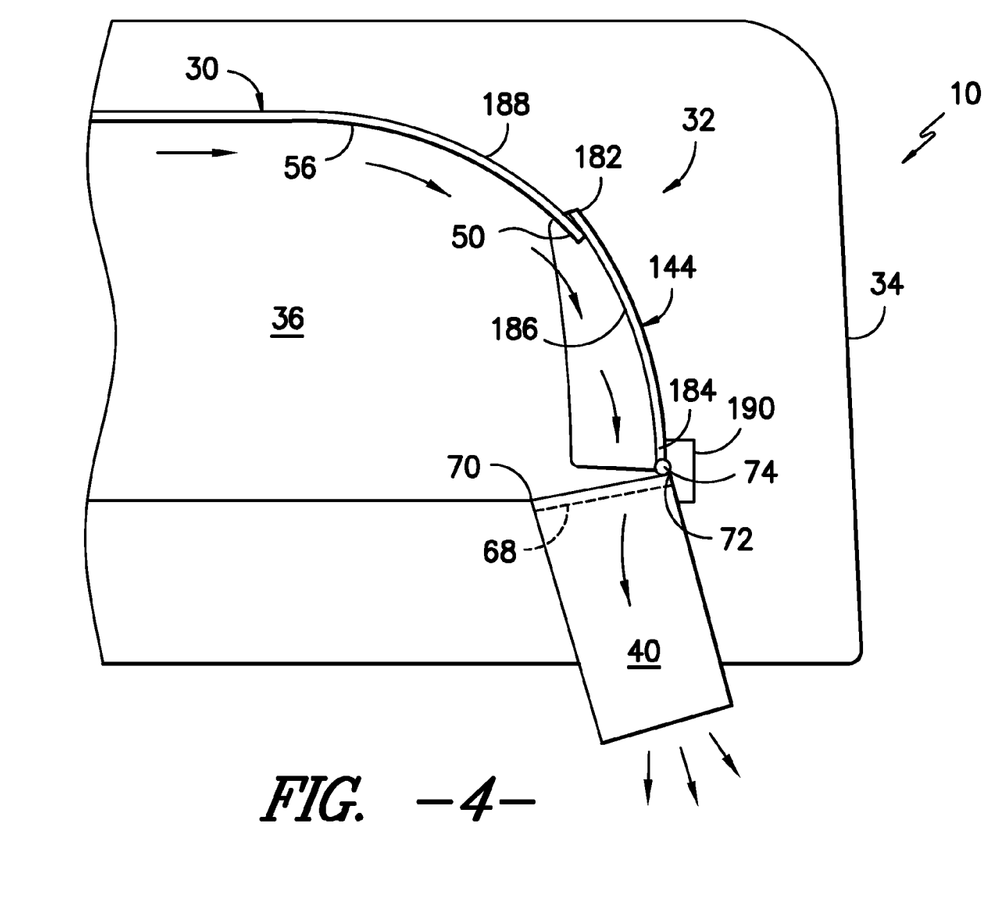
FIG. 4 illustrates an interior, side view of another embodiment of a windrow door configured for use with the combine shown in FIG. 1, particularly illustrating a door panel of the windrow door in a closed position.
Figure 5:
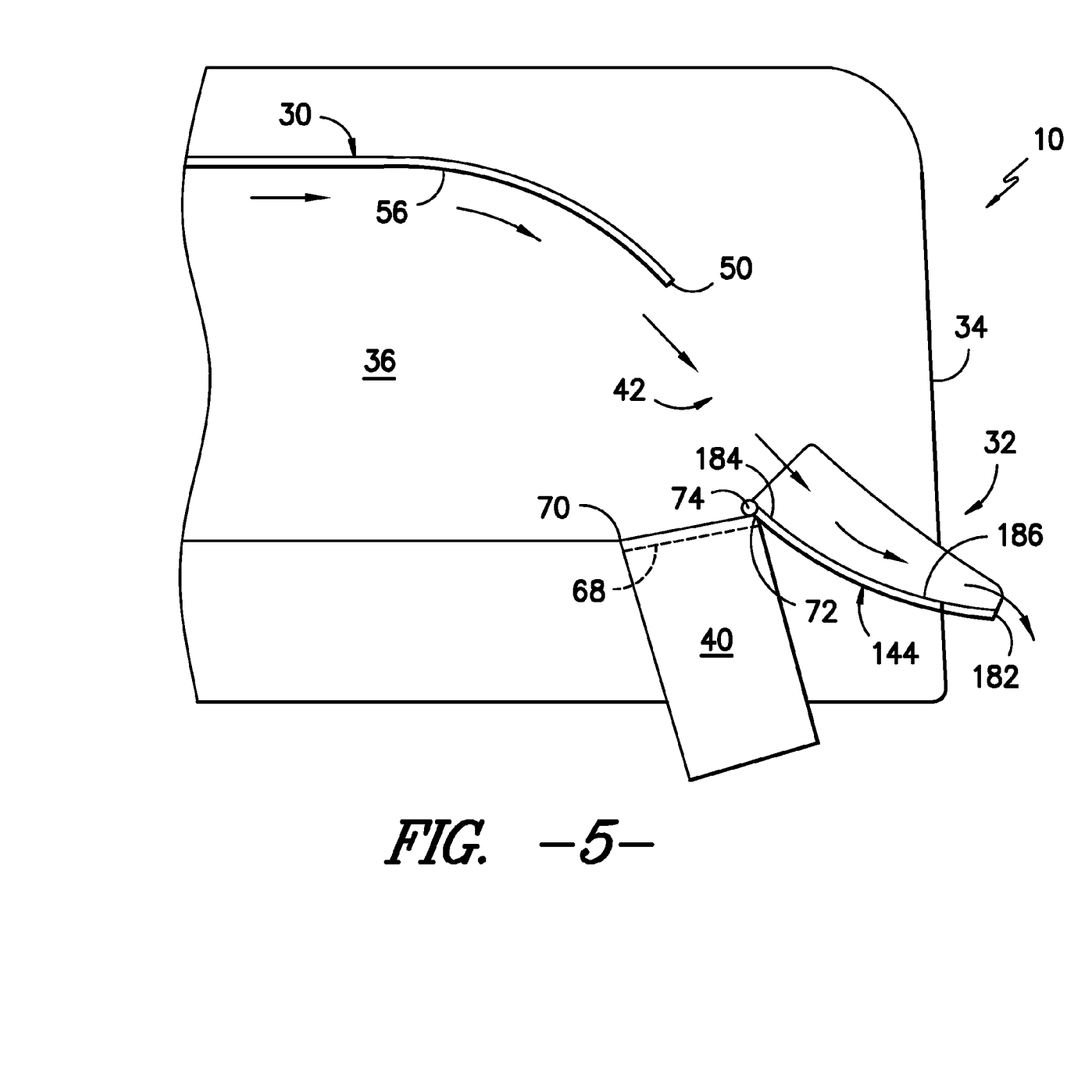
FIG. 5 illustrates another interior, side view of the windrow door shown in FIG. 4, particularly illustrating the door panel in a chute position.

Referring now to FIGS. 4 and 5, a variation of the windrow door 32 shown in FIGS. 2 and 3 is illustrated in accordance with aspects of the present subject matter. As shown, instead of including upper and lower door panels 44, 46, the windrow door 32 may simply include a single door panel 144 extending lengthwise between a first end 182 and a second end 184, with the second end 184 being rotatably coupled to the spreader 40 (e.g., at the rear edge 72 of the inlet 68). Thus, the door panel 144 may be configured to be rotated between appropriate positions for guiding the crop residue into the spreader 40 and for windrowing the crop residue onto a field. For example, as shown in FIG. 2, door panel 144 may be configured to be rotated into a closed position at which the crop residue flowing past the downstream end 50 of the guide panel 30 is directed along an inner surface 186 of the door panel 144 and into the spreader 40. Specifically, as shown in the illustrated embodiment, the first end 182 of the door panel 144 may be configured to overlap the downstream end 50 of the guide panel 30 when the door panel 144 is in the closed position. As such, the inner surface 56, 186 of the guide panel 30 and the door panel 144 may generally define a continuous flow path for the crop residue flowing along the panels 30, 144 and into the spreader 40.

Similar to the embodiment described above, it should be appreciated that the overlapped configuration of the panels 30, 144 may allow for the door panel 144 to slide along an outer surface 188 of the guide panel 30 in the event that the spreader 40 is configured to be rotated upwards into a stored position. However, in other embodiments, the ends 50, 182 of the guide and door panels 30, 144 may be configured to have any other suitable positioning relative to one another when the door panel 144 is moved to the closed position.

Additionally, as shown in FIG. 5, similar to the lower door panel 46 described above, the door panel 144 may also be configured to be moved into a chute position, thereby allowing the door panel 144 to serve as a windrow chute for the crop residue discharged through the rear opening 42. Accordingly, the crop residue flowing past the downstream end 50 of the guide panel 30 may be directed through the rear opening 42 and onto the door panel 144. The crop residue may then be directed along the inner surface 186 of the door panel 144 and subsequently expelled from the panel 144 at its first end 182 as a windrow onto a field.

It should be appreciated that, when the windrow door 32 is configured as a single door panel, it may be desirable to reconfigure the guide panel 30 so that the crop residue is directed onto the door panel 144 when it is in the chute position. For example, as shown in FIG. 5, the guide panel 30 may be lengthened and/or may be angled downward (relative to the embodiment shown in FIGS. 2 and 3) such that the curvature or tangential flow direction of the inner surface 56 of the guide panel 30 at its downstream end 50 is directed towards the door panel 144. Thus, when the door panel 144 is moved to the chute position, the crop residue flowing past the downstream end 50 of the guide panel 30 may be directed through the rear opening 42 and onto the door panel 144.

It should also be appreciated that, similar to the upper and lower door panels 144, 146 described above, the position of the door panel 144 may be configured to be adjusted manually or automatically. For example, as shown in FIG. 4, a suitable actuating device 190, such as a motor, may be coupled to the door panel 144 for automatically rotating the panel 144 between the closed and chute positions.

Figure 6:
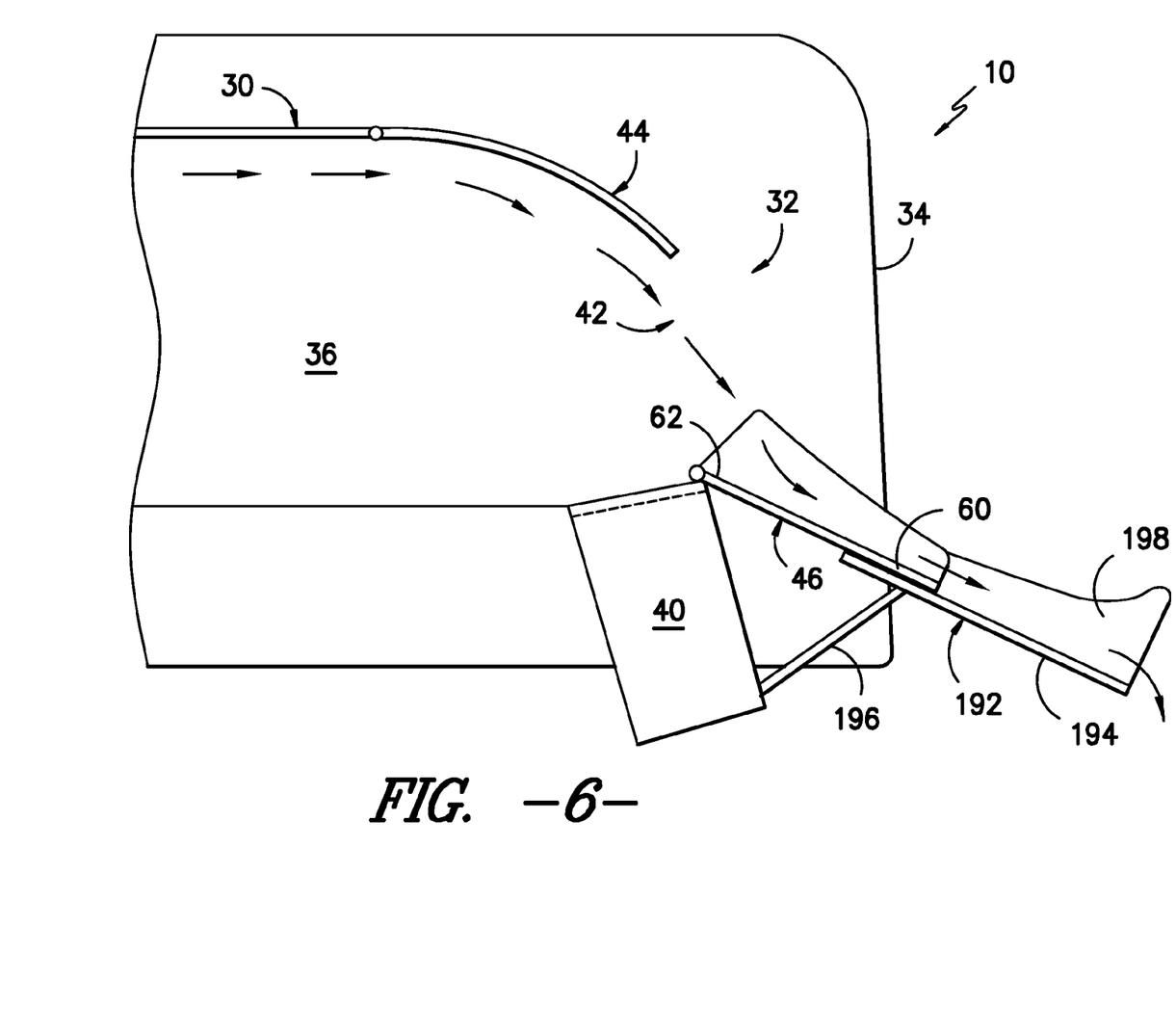
FIG. 6 illustrates an interior, side view of the embodiment of the windrow door shown in FIG. 3, particularly illustrating the door panel opening into an auxiliary windrow chute of the combine.

Additionally, as an alternative to configuring the lower door panel 46 or the door panel 144 to serve as the entire windrow chute for the combine 10, the lower door panel 46 or door panel 144 may, instead, be configured to form only a portion of the combine's windrow chute. For example, FIG. 6 illustrates the configuration of the windrow door 32 shown in FIG. 3. However, in addition to the lower door panel 45, the combine 10 may also include an auxiliary windrow chute 192 extending outwardly from the rear end 34 of the combine 10. In such an embodiment, the lower door panel 46 may be configured to be rotated to a position adjacent to the auxiliary windrow chute 192 when in the chute position. For example, as shown in the illustrated embodiment, the lower door panel 46 may be configured to contact or be engaged against the auxiliary windrow chute 192, such as by configuring the first end 60 of the lower door panel 46 to overlap a portion of the auxiliary windrow chute 192. As such, the crop residue discharged through the rear opening 42 and onto the lower door panel 46 may be directed along both the lower door panel 46 and the auxiliary windrow chute 192 before being expelled onto the field as a windrow. A similar configuration may also be provided for the embodiment shown in FIGS. 4 and 5 such that the door panel 144 and the auxiliary windrow chute 192, form the entire windrow chute of the combine 10.

It should be appreciated that the auxiliary windrow chute 192 may generally be configured the same as or similar to any suitable windrow chute known in the art. For example, in several embodiments, the windrow chute 192 may include a base panel 194 coupled to a component of the combine 10 (e.g., the spreader 40) via a suitable bracket or linkage 196. The base panel 194 may generally be configured to define a flow surface for the crop residue. In addition, the auxiliary windrow chute 192 may include side panels 198 (one of which is shown) extending upwardly from the base panel 194.

In one embodiment, the side panels 198 may be configured to converge as the auxiliary windrow chute 192 extends away from the lower door panel 46 (or door panel 144), thereby allowing the width of the flow of the crop residue to be reduced before it is discharged from the chute 194 onto a field as a windrow.

It should also be appreciated that, although the present subject matter has been generally described above with reference to the lower door panel 46 and the door panel 144 being rotatably coupled to the spreader 40, the second end 62 of the lower door panel 46 and/or the second end 184 of the door panel 144 may generally be configured to be coupled to any other suitable component of the combine 10 that permits such panels 46, 144 to be rotated relative to the spreader 40 between the closed and chute positions. For example, in one embodiment, the second ends 62, 184 of the panels 46, 144 may be coupled to a suitable support member (e.g., a bracket or tube) or panel positioned at and/or adjacent to the spreader 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A windrow door for controlling a direction of flow of crop residue expelled from a combine, the combine including a spreader, the windrow door comprising:
    a door panel extending lengthwise between a first end and a second end, the door panel configured to be moved relative to the spreader between a closed position, wherein the crop residue being expelled from the combine is directed along the door panel and into the spreader, and a chute position, wherein the crop residue is directed through a rear opening of the combine and onto the door panel;
    wherein the first end of the door panel is mounted for rotation with respect to the spreader and the door panel is configured to be angled downward from the spreader when in the chute position such that the first end of the door panel is positioned vertically below the rear edge of an inlet of the spreader.

2. The windrow door of claim 1, wherein the second end of the door panel is rotatably coupled to the spreader.

3. The windrow door of claim 1, wherein the door panel is configured to be positioned adjacent to an auxiliary windrow chute of the combine when in the chute position.

4. The windrow door of claim 1, further comprising a pair of side panels extending from an inner surface of the door panel, the side panels extending lengthwise at least partially between the first and second ends of the door panel.

5. The windrow door of claim 1, wherein the door panel and a guide panel of the combine are configured to define a substantially continuous flow surface for the crop residue flowing into the spreader when the door panel is in the closed position.

6. The windrow door of claim 4, wherein the first end of the door panel is configured to rotate to a position to overlap a downstream end of the guide panel when the door panel is in the closed position to close the opening.

7. A windrow door for controlling a direction of flow of crop residue expelled from a combine, the combine including a spreader, the window door comprising:
    an upper door panel extending lengthwise between an upstream end and a downstream end, the upper door panel moveable between a closed position, wherein the crop residue being expelled from the combine is directed along the upper door panel towards the spreader, and an opened position, wherein the crop residue is directed along the upper door panel through a rear opening of the combine; and
    a lower door panel extending lengthwise between a first end and a second end, the lower door panel configured to be moved relative to the spreader between a closed position and a chute position, the lower door panel configured to be moved to the chute position when the upper door panel is in the opened position such that the crop residue expelled through the rear opening is directed onto the lower door panel wherein in the chute position the first end of the lower door panel is positioned vertically below the rear edge of an inlet of the spreader.

8. The windrow door of claim 7, wherein the second end of the lower door panel is configured to be rotatably coupled the spreader.

9. The windrow door of claim 8, wherein the spreader comprises an inlet having an forward edge and a rear edge, the second end of the lower door panel being configured to be rotatably coupled to the spreader at the rear edge of the inlet.

10. The windrow door of claim 7, wherein the lower door panel is configured to be moved to the closed position when the upper door panel is in the closed position such that the crop residue flowing past the downstream end of the upper door panel is directed along the lower door panel and into the spreader.

11. The windrow door of claim 10, wherein the first end of the lower door panel is configured to rotate to a position to overlap the downstream end of the upper door panel when the upper and lower door panels are in the closed positions such that the rear opening is blocked wherein the rotation of the lower panel overlaps the upper panel closing the opening.

12. The windrow door of claim 6, wherein the lower door panel is configured to be positioned adjacent to an auxiliary windrow chute of the combine when in the chute position.

13. The windrow door of claim 6, further comprising a pair of side panels extending from an inner surface of the lower door panel, the side panels extending lengthwise at least partially between the first and second ends of the lower door panel.

14. An agricultural combine, comprising:
    a threshing system configured to separate a flow of crop material into crops and a crop residue;
    a crop residue distribution system configured to expel the crop residue from the combine, the crop residue distribution system comprising a spreader and a windrow door configured to control a direction of flow of the crop residue between the spreader and a rear opening of the combine, the windrow door comprising a door panel extending lengthwise between a first end and a second end, the door panel configured to be moved relative to the spreader between a closed position, wherein the door panel blocks at least a majority of a rear opening and the crop residue being expelled from the combine is directed along a first surface of the door panel and into the spreader, and a chute position, wherein the crop residue is directed through the rear opening and onto the first surface of the door panel after passing through the rear opening of the combine, wherein a first end of the door panel is positioned vertically below the rear edge of an inlet of the spreader in the chute position.

15. The agricultural combine of claim 14, wherein the second end of the door panel is configured to be rotatably coupled the spreader.

16. The agricultural combine of claim 15, wherein the spreader comprises an inlet having a forward edge and a rear edge, the second end of the door panel being configured to be rotatably coupled to the spreader at the rear edge of the inlet.

17. The agricultural combine of claim 14, wherein the door panel is configured to be positioned adjacent to an auxiliary windrow chute of the combine when in the chute position.

18. The agricultural combine of claim 14, wherein the door panel comprises a lower door panel and further comprising an upper door panel extending lengthwise between an upstream end and a downstream end, the upper door panel moveable between a closed position, wherein the downstream end of the upper door panel is positioned adjacent to the first end of the door panel, and an opened position, wherein the crop residue is directed along the upper door panel and through the rear opening.

\* \* \* \* \*